3,658,810
PROCESS FOR THE PREPARATION OF ε-CAPROLACTAM

Ikuzo Tanaka, Hideo Uehara, and Makoto Tanaka, Tokyo, Japan, assignors to Teijin Limited, Osaka, Japan
No Drawing. Filed Aug. 29, 1969, Ser. No. 854,263
Claims priority, application Japan, Sept. 4, 1968, 43/63,611; Sept. 30, 1968, 43/71,048
Int. Cl. C07d 41/06
U.S. Cl. 260—239.3                                                  4 Claims

ABSTRACT OF THE DISCLOSURE

A process for the preparation of ε-caprolactam by contacting continuously with steam ε-aminocaproic acid, ε-caproamide or a mixture of the two at a temperature of 150–400° C., while discharging the steam from the reaction system. In this process a substance non-volatile and acidic under reaction conditions can be preferably used as catalyst. By this process, ε-caprolactam can be produced with high yield without formation of ammonium sulfate.

---

This invention relates to a process for the preparation of ε-caprolactam. More particularly, the invention relates to a process for making ε-caprolactam from ε-aminocaproic acid, ε-aminocaproamide, or mixtures thereof.

Various methods are known for making ε-caprolactam from ε-aminocaproic acid or ε-aminocaproamide, which include the following:

(a) Melt dehydration method

A method wherein, for example, ε-aminocaproic acid is heated above its melting point, and subjected to a reduced pressure distillation. (W. H. Carothers & G. J. Berchet, Journal of the American Chemical Society, vol. 52, p. 5289 (1930)).

(b) Method using dehydrating catalyst

Method of passing an aqueous solution of ε-aminocaproic acid on a dehydrating catalyst, such as phosphotungstic acid on silica gel, etc. (Chem. Abstr., 48 8815h (1954)).

(c) Method using organic solvent

Method of heating ε-aminocaproic acid or ε-aminocaproamide in an organic solvent such as alcohol, under elevated pressure. (Chem. Abstr., 50 9443g (1956); Chem. Abstr., 51 17984h (1957)).

(d) Method employing alkaline substance

Method of heating ε-aminocaproamide in the presence of an alkaline substance under reduced pressure. (German Patent No. 859,015).

Besides the foregoing known methods, recently another method: (e), in which ε-caprolactam is formed by heating an aqueous solution of ε-aminocaproic acid to cause ring closure of said acid, is reported. (Chemical & Engineering News (1967) June 19, p. 52).

All of the foregoing methods, however, are defective in some way or another, and cannot be regarded as satisfactory methods for industrial preparation of ε-caprolactam. For example, in the above method (a), the greater part of the starting material is converted to the polymer thereof, and the desired ε-caprolactam is obtained only with the yield as low as approximately 30%. The method (b) also shows poor yield of ε-caprolactam. With the method (c), it is possible to obtain ε-caprolactam in a considerably high yield, but large quantities of an organic solvent are required and furthermore, since the reaction is performed in a closed system, the reaction must be operated under high pressures. The method (d) is also defective in that large amount of a diluent, for example, mixtures of sodium acetate and potassium acetate, must be used in the attempt to obtain ε-caprolactam in a high yield. The method (e) is also defective in that an aqueous solution of ε-aminocaproic acid must be directly exposed to high temperatures and high pressures in a closed system. Furthermore, polymer is also obtained as by-product in the reaction system, which must be depolymerized in order to increase the ε-caprolactam yield.

Accordingly, therefore, the object of the present invention is to provide a process for the preparation of ε-caprolactam from ε-aminocaproic acid, ε-aminocaproamide, or mixtures thereof, with ease in a high yield.

Another object of the invention is to provide an economical process for the preparation of crude ε-caprolactam, which can be very easily refined to highly pure ε-caprolactam.

Still another object of the invention is to provide an industrially advantageous process for the preparation of ε-caprolactam, which can be practiced under atmospheric pressure or slightly reduced pressures in a simple apparatus and without proceeding via Beckmann rearrangement reaction as an intermediate step, whereby being able to avoid side-production of ammonium sulfate.

Other objects and advantages of the invention will become apparent from the following descriptions.

The foregoing objects and advantages are accomplished according to the process of this invention, in which ε-aminocaproic acid, ε-aminocaproamide, or a mixture of the two, is heated and characteristically steam is continuously introduced into the reaction system to be contacted with the ε-aminocaproic acid, ε-aminocaproamide, or a mixture thereof, at temperatures ranging from 150 to 400° C., and the steam introduced is continuously distilled off from the reaction system, and ε-caprolactam is separated from the said distillate.

Hereinafter the invention will be explained in further details.

ε-Aminocaproic acid, ε-aminocaproamide, or mixtures of the two, which are used as the starting materials in the subject process, can be prepared by various methods disclosed in, for example, the following literatures:

(i) The Journal of Organic Chemistry, 32, 1995, (1967),
(ii) Journal of the American Chemical Society, 68, 1968 (1946),
(iii) Chemische Berichte 92, 2616 (1959).

We also discovered that the starting materials of this invention, i.e., ε-aminocaproic acid, ε-aminocaproamide, or mixtures thereof, can be advantageously prepared by contacting 2-nitrocyclohexanone and/or 2-nitrocyclohexene-1-ol with hydrogen in an aqueous medium, in the presence of an active hydrogenation catalyst and optional presence of ammonia, the process being the subject of our prior patent application, No. 835,796. ε-Aminocaproic acid, ε-aminocaproamide, or mixtures thereof which are prepared by the above-described process can be used as the starting materials in the invention, either in an isolated or a non-isolated form. In the latter case the reaction mixture may be used as the starting material of the subject process, in the form of a solution in water or other aqueous medium.

Obviously, ε-aminocaproic acid, ε-aminocaproamide, or mixtures thereof, which are prepared by any of the foregoing method, can be similarly used as the starting material of the invention, either in an isolated form or as a solution in water or other aqueous medium.

As such aqueous medium, for example, no more than approximately 30 wt. percent aqueous solutions of lower aliphatic alcohols, ethers of 4–8 carbons, etc., can be used, but such alcohols or ethers are not necessarily required for practicing the invention.

According to the invention, the above starting material is fed into the reaction system, and steam is continuously introduced into the system and the starting material is contacted with the steam at temperatures ranging from 150 to 400° C., preferably 200–350° C. Thereafter, the steam introduced is continuously distilled off from the reaction system.

Whereupon the starting material, i.e., ε-aminocaproic acid, ε-aminocaproamide, or a mixture of the two is subjected to intramolecular dehydration reaction or intramolecular de-ammoniation reaction, and is converted to ε-caprolactam which is distilled off from the reaction system together with the steam.

Therefore, a part or whole of the distillate is condensed by cooling, and ε-caprolactam formed is isolated from the resulting condensate, i.e., aqueous lactam solution, by any suitable means.

As suitable means for the isolation, any known unit operation may be used in combination, such as, for example, (a) removing excess water from the aqueous lactam solution and thereafter isolating ε-caprolactam by distillation, (b) extracting the aqueous lactam solution with an organic solvent which is a good solvent for lactam but immiscible with water, such as chloroform, and thereafter isolating ε-caprolactam by distillation or recrystallization, (c) concentrating the aqueous lactam solution and thereafter isolating ε-caprolactam by recrystallization, etc.

In order to maintain the temperature of the reaction system at 150–400° C., preferably at 200–350° C. after feeding the starting material, the system may be internally or externally heated by suitable means. For example, the system is externally heated by heaters or is internally heated by passing steam, preferably superheated steam, through the reaction system. Or, the two heating methods may be used in combination. In short, the object of the invention is achieved so long as the starting material is maintained at 150–400° C., preferably at 200–350° C., in the reaction system, and is contacted with the steam intoduced continuously into the reaction system as intimately as possible, at the specified temperature range. In a particularly preferred heating system for effecting the above object, superheated steam of 100–500° C., preferably 200–450° C. is introduced into the reaction system, and simultaneously the starting material is suitably heated from outside the reaction apparatus. Incidentally, the steam is not necessarily to be saturated. For example, it is quite appropriate to heat saturated steam under low pressures, e.g. atmospheric to 20 atmospheres, preferably from atmospheric to 5 atmospheres, further up to the temperature of preferably 200–450° C. and to introduce the resulting superheated steam into the reaction system.

Suitable amount of the steam to be introduced into the reaction system is that enough to distill off the ε-caprolactam formed in the reaction system in the form of steam distillation. Normally it is sufficient for this purpose to use steam in amounts of 1–40 times of the total weight of starting material, i.e., ε-aminocaproic acid, ε-aminocaproamide, or a mixture thereof.

The pressure within the reaction system is not critical. It may be either reduced, atmospheric, or elevated, so far as the condition allows the water substantially equal to the amount of steam introduced and the water formed by ring closure reaction of the starting material to be distilled off from the reaction system. Normally a pressure of 0.5–5 atmospheres, particularly from the atmospheric to 3 atmospheres, is suitable. A particularly notable advantage of the invention resides in that, the ε-caprolactam-forming reaction can be smoothly progressed under not very high pressures, but around atmospheric pressure.

Also according to the invention, because substantially equal amount of steam to that introduced into the reaction system is distilled off from the reaction system and also because the starting material is heated at 150–400° C., preferably 200–350° C., even when the starting material is supplied into the reaction system as a solution in water or other aqueous medium, the water or aqueous medium is distilled off from the reaction system together with the steam. Thus, according to the invention, even if the starting material is supplied into the reaction system in the form of a solution in water or other aqueous medium, no substantial amount of condensed water is existed in the reaction system when the reaction is substantially progressed (cf. later given example).

By the foregoing procedures, ε-caprolactam can be smoothly formed from ε-aminocaproic acid, ε-aminocaproamide, or mixtures thereof (the starting material), with very simple operation and without using any special organic solvent. Particularly when the invention is practiced in such a manner that the starting material is heated to 200–350° C., inter alia, 250–300° C. in the reaction system, and contacted with steam, preferably superheated steam, ε-caprolactam can be formed in a high yield at a high selectivity.

The subject process can be practiced normally in a reaction apparatus provided with an inlet pipe of superheated steam, an inlet pipe of starting material, an outlet pipe for distillation, a heating device, and optionally with a stirrer.

As the type of reactors useful for practicing the invention, the following may be named by way of examples: a spray-type reactor in which superheated steam is sprayed into the starting material from the bottom to cause the reaction; a packed tower-type reactor in which the starting material is fed from above the reaction tower packed with a filler and superheated steam is blown into the same tower from the bottom; a wetted-wall tower-type reactor in which the starting material is fed from above the reaction tower or a tower inside of which is divided by a partition, and steam is blown into the tower from below; etc.

The starting material can be fed into the reaction system either batchwise or continuously, as solid or as an aqueous solution.

Because the reaction in accordance with this invention is performed at such high temperatures as 150–400° C., preferably 200–350° C., under continuous supply of superheated steam and continuous distillation of the steam from the reaction system, when the starting compound or compounds of the invention are supplied either batchwise or continuously to the reaction system in the form of an aqueous solution, the water in the solution is quickly distilled off from the reaction system accompanied with the superheated steam. Thus the intended ring closure reaction of the starting material progresses in the substantial absence of condensed water. On the other hand, the ε-caprolactam formed distils off from the reaction zone together with steam, so that aqueous lactam solution can be obtained by condensing the distillate. In this case, the steam may be introduced into the reaction system to which the starting material has been already supplied, or the steam and starting material may be supplied into the reaction system simultaneously. Or, furthermore, the starting material may be supplied into the reaction zone to which continuous supply of steam is being effected.

Also in accordance with the invention, the rate of the ring closure reaction of the starting material can be raised and the subject ε-caprolactam can be obtained in excellent yield, by contacting the starting material, i.e., ε-aminocaproic acid, ε-aminocaproamide, or a mixture of the two, with steam, in the presence of a suitable catalyst. As such catalyst, for example, substances which are non-volatile and acidic in the subject system are conveniently used. As examples of such non-valatile, acidic substances, the following compounds can be named.

(A) Phosphorus-containing acidic substances

Phosphoric acids such as ortho-phosphoric acid, hypophosphoric acid, and phosphorous acid; condensed phosphoric acids such as pyrophosphoric acid, polyphosphoric acid, meta-phosphoric acid, and phosphoric acid on carrier; ammonium salts of phosphoric acids or condensed phosphoric acids such as ammonium dihydrogenphosphate, diammonium hydrogenphosphate, triammonium phosphate, ammonium pyrophosphate, acid ammonium pyrophosphate, and ammonium metaphosphate; water-soluble, acidic, and metal-containing salts of phosphoric acids or condensed phosphoric acids, such as, for example, sodium dihydrogenphosphate, potassium dihydrogenphosphate, lithium dihydrogenphosphate, acid sodium pyrophosphate, acid potassium pyrophosphate, acid lithium pyrophosphate, calcium dihydrogenphosphate, magnesium dihydrogenphosphate, aluminum dihydrogenphosphate, acid aluminum pyrophosphate and sodium metaphosphate; metal-containing ammonium salts of phosphoric acids or condensed phosphoric acids such as sodium ammonium hydrogenphosphate, and sodium ammonium pyrophosphate; salts of phosphoric acids or condensed phosphoric acids with organic amines such as methylamine, aniline, etc.; and adducts of phosphoric acids or condensed phosphoric acids with organic basic substances such as, for example, $\epsilon$-caprolactam:

(B) Sulfur-containing acidic substances

Sulfuric acid; organic sulfonic acids such as, for example, meta-benzenedisulfonic acid and 1,5-pentanedisulfonic acid; neutral or acidic ammonium salts of sulfuric acid such as ammonium sulfate, and ammonium hydrogensulfate; and acidic metal salts of sulfuric acid such as supric sulfate, ferric sulfate, aluminum sulfate, etc.:

(C) Solid acids

Solid acid catalysts such as silica-alumina gel, ammonium- or hydrogen-exchanged zeolite, aluminum phosphate, titanium phosphate, zirconium phosphate, titanic acid, etc.

(D) Others

Boron-containing acidic compounds such as boric anhydride, metaboric acid, ammonium borate, etc.

According to our reasearches, it has been confirmed that the substances which are non-volatile and exhibit acidity under the reaction condition of the invention as named above show particularly favorable catalytic activity for the ring-closure reaction of the starting material. Those phosphates named under group (A), such as sodium ammonium hydrogenphosphate and triammonium phosphate, are themselves, basic salts, but they are decomposed when contacted with steam at 150–400° C. in the reaction system of the invention, and the former is converted into sodium hydrogenpyrophosphate or sodium metaphosphate, and the latter, into ammonium dihydrogenphosphate, or ammonium metaphosphate, all being acidic phosphates. Therefore, they can also be used as the catalysts in the reaction of subject process, as within the category of above-described acidic substances. However, for example, disodium hydrogenphosphate shows no effective catalytic activity, since the compound itself is not acidic, and furthermore is not converted into acidic phosphate when contacted with steam at 150–400° C., i.e., under the specified reaction conditions of the subject process. Again, the acids which are volatile under the reaction conditions, such as hydrochloric acid, or the compounds which are decomposed and converted to acidic substances under the reaction conditions but are volatilized, are not suitable as the catalysts for subject reaction.

The inventors of the present invention added such a substance as phenol, terephthalic acid and bis-phenol A of the following formula

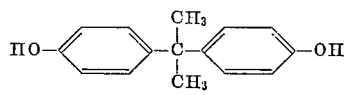

to the reaction system of the present invention as the organic acidic substance, but found that all of such compounds were distilled out of the reaction system together with steam, and did not exhibit a satisfactory catalytic effect.

Among the sulfur-containing acidic substances enumerated under group (B), for example, sulfuric acid decomposes and volatilizes at approximately 280° C. Therefore, when such a compound is used as the catalyst, it is desirable to effect the reaction at temperatures below its decomposition point. That is, in case the catalyst is sulfuric acid, it is desirable to conduct the reaction at below 280° C., particularly below 250° C., within the specified reaction conditions of the invention.

Thus, as the catalyst, the various phosphoric acids, condensed phosphoric acids, and acidic salts thereof as named under group (A), particularly orthophosphoric acid, mono-, di-, and tri-ammonium salts of orthophosphoric acid, sodium dihydrogen orthophosphate, sodium metaphosphate, etc.; solid acids of group (C), particularly titanic acid and titanium phosphate; and boron-containing acidic compounds of group (D), particularly boric anhydride, are particularly preferred.

Those catalysts are suitably used in an amount of 0.1–20% by weight, preferably 0.5–10% by weight, to the starting compound of the invention which may be $\epsilon$-aminocaproic acid, $\epsilon$-aminocaproamide, or a mixture of the two.

Since the catalyst is non-volatile under the reaction conditions of the invention, it is unnecessary to separate the catalyst from the distillate after completion of the reaction.

The catalyst used remains in the reaction zone, which can be repeatedly used so long as it retains the catalytic activity. Subsequent addition of the catalyst can be suitably adjusted with the decrease of catalytic activity of the initially used catalyst.

Hereinafter the invention will be explained with reference to working examples, which should be in no case construed to limit the scope of subject invention.

EXAMPLE 1

In this example, a reactor was formed by connecting a three necked reaction flask equipped with a thermocouple, a steam inlet pipe and a distillation outlet pipe, with another three necked steam generating flask equipped with a quartz glass tube packed with filler. The quartz glass tube was heated with an electric oven so that the steam passing therethrough was heated to a predetermined temperature.

13.1 grams (0.10 mol) of $\epsilon$-aminocaproic acid was fed into the reaction flask, and into which superheated steam of 200–230° C. was fed at a rate of approximately 3 g. per minute, at the below indicated reaction temperatures and reaction times. The reaction temperature was controlled with a mantle heater. The steam containing $\epsilon$-caprolactam, which was distilled off through the distillation outlet pipe, was cooled and condensed. Distilling water off from the condensate under a reduced pressure, 9.91 g. of light yellow, crystalline solid was obtained. The crystal was dissolved in chloroform, and 1.13 g. (recovery ratio, 8.6%) of the insoluble $\epsilon$-aminocaproic acid was separated by filtration. The filtrate was concentrated to dryness. Thus 8.58 g. of light yellow, crystalline solid was obtained, which was further dissolved in ether and filtered to be removed of 0.13 g. of an insoluble matter. The filtrate was concentrated to dryness. Thus 8.31 g. of $\epsilon$-caprolactam (the yield, 73.5%; the melting point, 66°–68° C.) was obtained. The purity of the $\epsilon$-caprolactam as determined by means of gas chromatography was 97%. 1.17 g. of the residue after the reaction was polymer.

|                                  | 1       | 2       | 3       | 4       | 5       | Total |
|----------------------------------|---------|---------|---------|---------|---------|-------|
| Reaction temp. (° C.)            | 115–200 | 200–290 | 290–310 | 290–300 | 290–300 |       |
| Reaction time (min.)             | 18      | 12      | 60      | 60      | 120     | 270   |
| Product (g.)                     | 1.11    | 4.57    | 2.40    | 0.90    | 0.93    | 9.91  |
| Chloroform-insoluble portion (g.)| 0.27    | 0.51    | 0.25    | 0.07    | 0.03    | 1.13  |
| Ether-insoluble portion (g.)     |         | 0.08    |         | 0.05    |         | 0.13  |
| Ether-soluble portion (g.)       |         | 6.78    |         | 1.53    |         | 8.31  |

The ether-insoluble portion gave crystalline solid having a melting point of 347° C., upon recrystallization from methanol. The solid was identified to be cyclic dimer of ε-aminocaproic acid, from elementary analysis and infrared absorption spectrum.

*Elementary analysis.*—Calcd. for $C_2H_{22}N_2O_2$ (percent): C, 63.48; H, 9.82; N, 12.41. Found (percent): C, 63.68; H, 9.8; N, 12.41.

EXAMPLE 2

13.0 grams (0.10 mol) of ε-aminocaproamide was supplied into the reactor described in Example 1, and into which superheated steam of 200–240° C. was blown at a rate of approximately 3 g. per minute. The reaction was performed at 110–205° C. for 15 minutes, at 205–300° C. for 7 minutes, and then at 300–305° C. for 278 minutes. The steam containing ε-caprolactam, which was distilled off from the reaction system, was condensed by cooling, and resulting aqueous lactam solution was extracted 5 times, with 50 ml. of chloroform each time thereafter dried with dry sodium sulfate. After removing the drying agent, the filtrate was concentrated. Thus 7.93 g. of light yellow, crystalline solid was obtained, which was subsequently dissolved in ether and 0.49 g. of insoluble, viscous solid was filtered off. Distilling the ether off from the filtrate, 7.11 g. of ε-caprolactam (the yield, 63%; the melting point, 65–68° C.) was obtained. 2.89 g. of the residue remaining after the reaction was polymer.

EXAMPLE 3

A reactor similar to that described in Example 1 was charged with a mixture of 7.9 g. (0.06 mol) of ε-aminocaproic acid and 5.2 g. (0.04 mol) of ε-aminocaproamide, and into which superheated steam of 330–350° C. was blown at a rate of approximately 3 g. per minute. The reaction was performed at 110–220° C. for 20 minutes, at 200–300° C. for 5 minutes, and then at 290–310° C. for 275 minutes.

The steam containing ε-caprolactam, which was distilled off from the reaction system, was condensed by cooling. From the resulting aqueous lactam solution, water was distilled off under reduced pressures. By a reduced pressure distillation under nitrogen atmosphere, 7.70 g. of ε-caprolactam (the yield, 68%; the boiling point, 123°–127° C./6 mm. Hg) was obtained.

EXAMPLE 4

In this example, a reaction apparatus was formed of a reactor autoclave equipped with a distillation pipe and superheated steam inlet pipe, which was connected through a steam inlet pipe to another autoclave for steam generation. The connecting pipe portion was heated by an electric oven.

As the starting material, water-methanol solution of ε-aminocaproamide was used. The ε-aminocaproamide solution was obtained by heating 14.3 g. (0.10 mol) of 2-nitrocyclohexanone, 36.5 g. of 28% aqueous ammonia (ammonia: 600 mol percent of 2-nitrocyclohexanone), 64.0 g. of water, 64.0 g. of methanol, and 1.4 g. of stabilized nickel catalyst, at 90°–100° C. for 60 minutes under initial hydrogen pressure of 40 kg./cm.², and by filtering off the catalyst.

This water-methanol solution of ε-aminocaproamide was supplied into the aforesaid reactor autoclave. Separately, steam of approximately 20 kg./cm.² pressure, which was generated by heating water in the steam-generating autoclave to approximately 210° C., was further heated to 450–500° C. with the electric oven, and thereafter introduced into the reactor autoclave. The internal pressure of the reaction system was maintained at 4.5–5 kg./cm.² by controlling the needle valves on the distillation pipe of the reactor autoclave and on the steam-generating autoclave. The reaction was performed under said pressure, at 100–360° C. for an hour, and at 370–400° C. for 3 hours. The steam containing ε-caprolactam, which was distilled through the distillation pipe, was condensed by cooling and concentrated. The concentrate was recrystallized from cyclohexane: Thus 6.3 g. of ε-caprolactam (the yield, 56%; the melting point, 66–68° C.) was obtained.

EXAMPLE 5

The same reaction apparatus as employed in Example 4 was used. Into the reactor autoclave, 43.7 g. of 30 wt. percent aqueous solution of ε-aminocaproic acid and also the steam of approximately 2 kg./cm.² pressure obtained by heating water in the steam-generating autoclave at approximately 120° C. was introduced. The distillation pipe of the reactor autoclave was connected to an exhaust pump through a condenser. The internal pressure of the reaction system was maintained at 0.5–0.7 kg./cm.² by controlling the needle valves on the distillation pipe and the steam-generating autoclave. The reaction was performed under said pressure, at 100–150° C. for 30 minutes, and at 150–180° C. for 5 hours. The aqueous solution of ε-caprolactam obtained from the condenser was concentrated and treated similarly to Example 1. Thus 1.1 g. of ε-aminocaproic acid (recovery ratio, 8.4%) and 3.7 g. of ε-caprolactam (the yield, 33%) were obtained.

Incidentally, the 30 wt. percent aqueous solution of ε-aminocaproic acid employed as the starting material in this example was prepared as follows: an autoclave was charged with 14.3 (0.1 mol) of a mixture of 2-nitrocyclohexanone and 2-nitrocyclohexene-1-ol (keto form 80%, enol form 20%), 6.1 g. of 28% aqueous ammonia (NH₃; 100 mol percent of 2-nitrocyclohexanone), 81.6 g. of deionized water and 2.8 g. of palladium on carbon catalyst (containing 5 wt. percent of palladium), and the system was reacted for 2 hours at 70–80° C., at an initial hydrogen pressure of 90 kg./cm.². After the reaction was completed, the catalyst was filtered off, and a part of water was also removed from the product.

EXAMPLE 6

The same reaction vessel as described in Example 4 was used. A solution of ε-aminocaproic acid in an aqueous medium, which was obtained by reacting 14.3 g. (0.10 mol) of 2-nitrocyclohexanone, 6.1 g. of 28% aqueous ammonia (ammonia; 100 mol percent of 2-nitrocyclohexanone), 128 g. of water, 20.0 g. of dioxane, and 1.4 g. of stabilized nickel catalyst under an initial hydrogen pressure of 40 kg./cm.², at 100° C., for 60 minutes, and filtering off the catalyst from the resulting reduction mixture, was fed into the reactor autoclave. The internal temperature of the autoclave was raised to approximately 100° C., and into which the steam of approximately 5 kg./cm.² obtained by heating water in the steam-generating autoclave to approximately 150° C., which was further heated to 410–440° C. with the electric oven, was supplied. The internal pressure of the reaction system was maintained at 2–3 kg./cm.² by controlling the needle valves on the steam-generating autoclave and on the distillation pipe of the reactor autoclave. Under the said pressure, the reaction was performed at 100–230° C. for an hour, and at 320–345° C. for 5 hours. The steam containing ε-caprolactam, which was distilled through the distillation pipe, was condensed by cooling. From the condensate a portion of water was distilled off to provide an approximately 10 wt. percent aqueous solution of ε-caprolactam. The solution was extracted with chloroform. The chloroform was removed by distillation, and the residue was distilled under reduced pressure. Thus 7.4 g. of ε-caprolactam (the yield, 66%) was obtained.

EXAMPLE 7

An autoclave of 300-ml. capacity was charged with 14.3 g. (0.10 mol) of 2-nitrocyclohexanone, 5.1 g. of liquid ammonia (300 mol percent of 2-nitrocyclohexanone), 90 g. of water and 1.4 g. of stabilized nickel catalyst, and hydrogen was introduced thereinto an initial pressure of 50 kg./cm.$^2$. The system was stirred at 62°–92° C. for an hour, and from the resulting aqueous solution of ε-aminocaproamide, the catalyst was filtered off. The filtrate was again put into the autoclave equipped with a starting material outlet pipe reaching the bottom, which was subsequently heated to 200° C. Similarly to the reaction apparatus described in Example 1, the four necked reaction flask was connected through a starting material inlet pipe to an autoclave charged with the starting material. Through the reactor steam of 240–260° C. was passed continuously, and into which the starting material was continuously supplied from the second autoclave charged with the starting material, while controlling the feed rate of the starting material and heating rate of the reactor with a mantle heater so as to maintain the internal temperature of the reactor at 180–230° C. After the material supply was completed, the reaction was further continued for 5 hours at 230–250° C. The steam containing ε-caprolactam, which was distilled off through the distillation pipe, was passed through a cooler in which hot water was circulated, so that a part thereof was distilled off as steam, and the remaining part was condensed by cooling to provide an aqueous ε-caprolactam solution, from which more water was distilled off. Recrystallizing the residue from cyclohexane, 5.6 g. of ε-caprolactam (the yield, 50%) was obtained.

EXAMPLE 8

The reactor autoclave described in Example 4 was charged with 131.3 g. of 30 wt. percent aqueous solution of ε-aminocaproic acid (0.30 mol as ε-aminocaproic acid) and 0.65 g. of 1.76 in specific gravity orthophosphoric acid (2.0 mol percent to the ε-aminocaproic acid). The steam of approximately 5 kg./cm.$^2$, which was obtained by heating water in the steam-generating autoclave at approximately 150° C., was further heated to 300–330° C. with the electric oven, and introduced into the reactor autoclave. The internal pressure of the reaction system was maintained at 2–3 kg./cm.$^2$ by controlling the needle valves on the steam-generating autoclave and on the distillation pipe of the reactor autoclave. The mixture was reacted under the said pressure, successively at 100–260° C. for an hour, and at 260–280° C. for another hour. The steam containing ε-caprolactam, was distilled off through the distillation pipe, and condensed by cooling. After water was distilled off from the condensate, 34.1 g. of a light yellow, crystalline solid was obtained. The product was further distilled under reduced pressure to provide 31.5 g. of ε-caprolactam. The yield was 94%.

EXAMPLE 9

The reactor described in Example 1 was supplied with 4.2 g. (0.032 mol) of ε-aminocaproamide and 0.32 g. (9.3 mol percent) of 1.76 in specific gravity orthophosphoric acid, and into which superheated steam at 310–320° C. was introduced at a rate of approximately 3 g. per minute. The mixture was reacted at 190–270° C. for 2 minutes, and at 270–310° C. for further 50 minutes. The steam containing ε-caprolactam, was distilled off from the reaction system, and was condensed by cooling. The condensate was subseqently treated as in Example 1. Thus 2.83 g. of ε-caprolactam (the yield was 78%) was obtained.

EXAMPLE 10

The reactor described in Example 1 was charged with a mixture of 6.11 g. (0.047 mol) of ε-aminocaproamide and 6.95 g. (0.053 mol) of ε-aminocaproic acid, and also 0.108 g. (1.0 mole percent) of 1.76 in specific gravity orthophosphoric acid. Then, into the reactor superheated steam at 200–230° C. was blown at a rate of approximately 3 g. per minute. The mixture was reacted successively at 110–200° C. for 15 minutes, at 200–300° C. for 7 minutes, and at 300–305° C. for 68 minutes. The steam containing ε-caprolactam was distilled off from the reaction system, and condensed by cooling. Water was removed from the condensate by distillation under reduced pressure. The condensate was subjected to another reduced pressure distillation under nitrogen atmosphere. Thus 9.85 g. of ε-caprolactam (the yield, 87%; the boiling point, 120–125° C./5 mm. Hg) was obtained.

EXAMPLE 11

The reactor described in Example 1 was charged with 13.1 g. (0.10 mol) of ε-aminocaproic acid, and 0.78 g. (5.0 mol percent) of sodium dihydrogenphosphate dihydrate, and into which superheated steam at 220–240° C. was blown at a rate of approximately 3.5 g. per minute. The mixture was reacted successively at 120–195° C. for 15 minutes, at 195–300° C. for 13 minutes, and at 285–300° C. for 56 minutes. The steam containing ε-caprolactam, was distilled off from the reaction system, and condensed by cooling. The condensate was extracted 5 times, with each 50 ml. of chloroform. The extract was dried with dry sodium sulfate and removed of the chloroform by distillation, to provide 10.33 g. of a light yellow, crystalline solid. The solid was dissolved in ether, from which 0.07 g. of an insoluble substance was filtered off. After ether was distilled off from the filtrate, 9.79 g. of ε-caprolactam was obtained in the yield of 87%.

EXAMPLE 12

The reactor described in Example 1 was charged with 43.7 g. of 30 wt. percent aqueous solution of ε-aminocaproic acid (0.10 mol as ε-aminocaproic aicd) and 1.31 g. of commercially available sodium hexametaphosphate, into which superheated steam at 310–330° C. was blown at a rate of approximately 2 g. per minute, at the reaction temperatures indicated below for the reaction times specified as same. The steam containing ε-caprolactam, was distilled off through the distillation pipe and condensed by cooling. After water distilled off from the condensate under reduced pressure, 11.2 g. of a light yellow crystalline solid was obtained totally. The solid was treated as described in Example 1. Thus 0.88 g. of crude ε-aminocaproic acid (recovery ratio of chloroform-insoluble portion; 6.7%), 0.08 g. of crude cyclic dimer yield of ether-insoluble portion; 0.7% and 10.17 g. of crude ε-caprolactam (ether-soluble portion; the yield, 90%) were obtained.

| | 1 | 2 | 3 | 4 | 5 | 6 | 7 | Total |
|---|---|---|---|---|---|---|---|---|
| Reaction temp. (° C.) | 100–110 | 110–150 | 150–200 | 200–280 | 280–290 | 280–290 | 280–290 | |
| Reaction time (min.) | 30 | 15 | 5 | 10 | 60 | 60 | 60 | 240 |
| Product (g.) | 0 | 0.3 | 1.4 | 3.9 | 3.2 | 2.4 | 0 | 11.2 |

EXAMPLES 13-22

The reactor described in Example 1 was charged with 13.1 g. (0.10 mol) of ε-aminocaproic acid and the catalyst specified in Table 1 below, into which superheated steam at the temperature as indicated in Table 1 was blown at the rate of approximately 2-4 g. per minute. The reaction system was heated with the mantle heater, to the reaction temperature predetermined, during initial 30-40 minutes. The mixture was reacted respectively for the indicated time. The reaction product was separated into a chloroform-insoluble portion (crude ε-aminocaproic acid), an ether-insoluble portion (crude cyclic dimer), and an ether-soluble portion (crude ε-caprolactam) by the treatments as described in Example 1. The results are also indicated below in Table 1.

TABLE 1

| Example No. | Catalyst Type | (Amount, g.) (percent) | Superheated steam temp. (° C.) | Reaction conditions Temp. (° C.) | Time (min.) | Crude ε-aminocaproic acid (amount, g.) (recovery ratio, percent) | Crude cyclic dimer (amount, g.) (yield, percent) | Crude ε-caprolactam (amount, g.) (yield percent) |
|---|---|---|---|---|---|---|---|---|
| 13 | Orthophosphoric acid | (0.098) / (0.91 mol) | 200-230 | 300-320 | 24 | (0.49) (3.8) | (0.13) (1.2) | (9.97) (88) |
| 14 | Metaphosphoric acid | (1.0 wt.) / (10 wt.) | 333-350 | 330-340 | 60 | (0.63) (4.8) | (0.17) (1.5) | (9.34) (83) |
| 15 | Phosphoric acid on kieselguhr | (1.31) / (10 wt.) | 220-230 | 290-310 | 180 | (1.52) (12) | (0.02) (0.2) | (9.00) (80) |
| 16 | Ammonium dihydrogen phosphate | (0.013) / (0.1 wt.) | 420-450 | 290-310 | 180 | (1.01) (7.7) | (0.07) (0.6) | (9.77) (86) |
| 17 | Diammonium hydrogen phosphate | (0.13) / (1.0 mol) | 210-224 | 290-320 | 40 | (0.40) (3.1) | (0.06) (0.5) | (8.81) (78) |
| 18 | Ammonium phosphate | (0.21) / (1.0 mol) | 250-260 | 290-315 | 60 | (0.71) (5.4) | (0.16) (1.4) | (9.77) (86) |
| 19 | Ammonium pyrophosphate | (1.31) / (10 wt.) | 170-200 | 250-270 | 60 | (0.52) (3.8) | (0.08) (0.7) | (9.93) (88) |
| 20 | Potassium hydrogen pyrophosphate | (1.31) / (10 wt.) | 270-300 | 280-300 | 60 | (0.71) (5.4) | (0.06) (0.5) | (9.87) (87) |
| 21 | Calcium dihydrogen phosphate | (1.31) / (10 wt.) | 370-390 | 290-300 | 60 | (0.69) (5.3) | (0.07) (0.6) | (9.45) (84) |
| 22 | Sodium ammonium hydrogen phosphate | (1.31) / (10 wt.) | 130-150 | 220-240 | 180 | (0.60) (4.6) | (0) (0) | (9.54) (85) |

EXAMPLE 23

An adduct of phosphoric acid with ε-caprolactam was prepared by reacting an equimolar mixture of 1.76 in specific gravity orthophosphoric acid and ε-caprolactam, at 90° C. for an hour. The reactor described in Example 1 was charged with 13.1 g. (0.10 mol) of ε-aminocaproic acid and 1.06 g. (5 mol percent) of the adduct, into which superheated steam at 350-370° C. was introduced at a rate of approximately 3 g. per minute. The mixture was reacted successively at 100-200° C. for 20 minutes, at 200-320° C. for 15 minutes, and at 320-330° C. for 60 minutes. The reaction product was treated as described in Example 1, and 9.72 g. of ε-caprolactam was obtained in the yield of 86%.

EXAMPLES 24-29

The reactor described in Example 1 was charged for each run with 13.1 g. (0.10 mol) of ε-aminocaproic acid and a catalyst of the type and the amount specified below, into which superheated steam at 300-330° C. was introduced at a rate of approximately 2 g. per minute. The reactor was heated with the mantle heater to the reaction temperature predetermined, during initial approximately 20 minutes. The mixture was reacted at the temperature and for the time indicated in Table 2 respectively. The steam containing ε-caprolactam as distilled off from the reaction system was condensed by cooling. Water was removed from the condensate by distillation. Then the remaining crystalline solid was extracted with ether. An ether soluble portion was concentrated, and distilled under reduced pressure. The amount obtained and the yield of ε-caprolactam in each run are shown in Table 2.

TABLE 2

| Ex. No. | Catalyst Type | Amount (g.) | Reaction conditions Temp. (° C.) | Time (min.) | ε-Caprolactam Amount (g.) | Yield (percent) |
|---|---|---|---|---|---|---|
| 24 | Sulfuric acid | 1.31 | 210-230 | 180 | 9.75 | 86 |
| 25 | m-Benzene disulfonic acid | 1.31 | 260-270 | 90 | 9.43 | 83 |
| 26 | Ammonium sulfate | 1.31 | 260-270 | 60 | 9.20 | 82 |
| 27 | Cupric sulfate | 1.31 | 220-240 | 180 | 8.71 | 77 |
| 28 | Ferric sulfate | 1.31 | 200-230 | 180 | 8.60 | 76 |
| 29 | Aluminum sulfate | 1.31 | 250-270 | 180 | 8.79 | 78 |

EXAMPLE 30

Pellets of Linde Molecular Sieve SK400 (a trade name for a synthetic zeolite produced by Union Carbide Corporation, U.S.A.) were ground. Per 2 g. of the said ground pellets, 100 g. of 5 wt. percent aqueous solution of ammonium chloride was added, to be refluxed together for 30 minutes. Then the powder was filtered off, and added to 100 g. of 5 wt. percent aqueous solution of ammonium chloride again. After an overnight's standing, the powder was filtered off, washed with water until chlorine ion was completely removed, and dried at 100° C. under reduced pressure.

The reactor described in Example 1 was charged with 1.31 g. of thus obtained ammonium-exchanged zeolite and 13.1 g. of (0.10 mol) of ε-aminocaproic acid, into which superheated steam at 310-340° C. was introduced at a rate of approximately 2 g. per minute. The mixture was reacted successively at 100-280° C. for 30 minutes, and at 280-300° C. for 240 minutes. The steam containing ε-caprolactam, distilled off through the distillation pipe and was condensed by cooling. The condensate was treated as described in Example 1. Thus, 1.36 g. of crude ε-aminocaproic acid (recovery ratio, 10%), 0.11 g. of crude cyclic dimer (the yield, 1.0%), and 8.74 g. of ε-caprolactam (the yield, 77%) were obtained.

EXAMPLE 31

The reaction of Example 30 was repeated except the use of 1.31 g. of decationized zeolite which was obtained by treating the ammonium-exchanged zeolite at 500° C. for 5 hours as the catalyst. The reaction product was treated in similar to Example 1. Thus 1.31 g. of crude ε-aminocaproic acid (recovery ratio, 10%), 0.13 g. of crude cyclic dimer (the yield, 1.2%), and 9.00 g. of ε-caprolactam (the yield, 80%) were obtained.

When SK–400 was used as the catalyst of the similar reaction without any additional treatment, the yield of ε-caprolactam was 57%, and when the SK–400 treated with calcium chloride was used, the ε-caprolactam yield of 59%.

chloroform-insoluble portion (crude ε-aminocaproic acid), an ether-insoluble portion (crude cyclic dimer), and an ether-soluble portion (crude ε-caprolactam), as described in Example 1. The results are indicated in Table 3 respectively.

| Example No. | Catalyst | | Superheated steam temp. (°C.) | Reaction conditions | | Crude ε-aminocaproic acid (amount, g.) (recovery ratio, percent) | Cyclic dimer (amount, g.) (yield, percent) | Crude ε-caprolactam (amount, g.) (yield, percent) |
|---|---|---|---|---|---|---|---|---|
| | Type | (Amount, g.) (wt. percent) | | Temp. (°C.) | Time (min.) | | | |
| 34 | Silica-alumina (N–631–L) | (1.31) (10) | 220–225 | 290–310 | 180 | (0.73) (5.6) | (0.07) (0.6) | (9.14) (81) |
| 35 | Aluminum phosphate | (1.31) (10) | 325–335 | 285–295 | 240 | (1.09) (8.3) | (0.15) (1.3) | (9.25) (82) |
| 36 | Titanium phosphate | (1.31) (10) | 322–340 | 285–290 | 240 | (0.73) (5.6) | (0.04) (0.3) | (9.64) (85) |
| 37 | Boric anhydride | (1.31) (10) | 244–254 | 270–310 | 240 | (1.60) (12) | (0.06) (0.5) | (9.83) (87) |
| 38 | Ammonium pentaborate | (1.31) (10) | 252–274 | 270–310 | 240 | (1.60) (12) | (0.08) (0.7) | (8.56) (76) |

EXAMPLE 32

Titanium tetrachloride was poured into ice water. The precipitate, which was formed upon addition of aqueous caustic soda solution thereto for neutralization, was filtered off. The precipitate thus obtained was dried at 107° C. to provide hydrated titanium dioxide (Ti content, 30 wt. percent; insoluble in water).

The reactor described in Example 1 was charged with 1.31 g. of the hydrate and 13.1 g. (0.10 mol) of ε-aminocaproic acid, and into which superheated steam at 326–350° C. was introduced at a rate of approximately 2 g. per minute. The mixture was reacted successively at 100–290° C. for 30 minutes, at 275–290° C. for 120 minutes. The steam containing ε-caprolactam, distilled off through the distillation pipe and was condensed by cooling. The condensate was treated as described in Example 1. Thus 0.94 g. of crude ε-aminocaproic acid (recovery ratio, 7.2%), 0.01 g. of crude cyclic dimer (the yield, 0.1%), and 9.95 g. of crude ε-caprolactam (the yield, 88%) were obtained.

EXAMPLE 33

Titanium tetrachloride was poured into ice-water, to which aqueous ammonia was added to form jelly precipitate. The precipitate was separated and dried at 40° C. to provide titanic acid (Ti content, 20 wt. percent; water-soluble as converted to sol).

The reactor as described in Example 1 was charged with 1.31 g. of the above titanic acid and 13.0 g. (0.10 mol) of ε-aminocaproamide. The reaction was performed in similar to Example 32. The steam containing ε-caprolactam as distilled off was condensed by cooling. The aqueous ε-caprolactam solution thus obtained was concentrated, and distilled under reduced pressure to provide 9.8 g. of ε-caprolactam (the yield, 87%).

EXAMPLES 34–38

The reactor as described in Example 1 was charged for each run with 13.1 g. (0.10 mol) of ε-aminocaproic acid and the catalyst of the type and the amount indicated in Table 3. Into the reactor, superheated steam at the temperature indicated, was introduced at a rate of approximately 3 g. per minute. The reactor was heated with the mantle heater to the temperature predetermined, during the initial 30–40 minutes. The mixture was reacted at the temperature, and for the time specified in Table 3 respectively. The reaction product was separated into a

We claim:
1. A process for the preparation of ε-caprolactam by heating ε-aminocaproic acid, ε-aminocaproamide, or a mixture thereof, which comprises continuously contacting said ε-aminocaproic acid, ε-aminocaproamide, or mixture thereof, with a flow of steam at a temperature of from 200–350° C. and a pressure of 0.5–5 atmospheres in the presence of a catalyst comprising a material which is non-volatile and acidic under the reaction conditions and selected from the group consisting of phosphoric acids; condensed phosphoric acids; water-soluble acidic and metal-containing salts of phosphoric acids and condensed phosphoric acids, ammonium salts of phosphoric acids and condensed phosphoric acids, metal-containing ammonium salts of phosphoric acids and condensed phosphoric acids, organic amine salts of phosphoric acids and condensed phosphoric acids; sulfuric acid; organic sulphonic acids, neutral or acidic ammonium salts and acidic metal salts of sulfuric acid; silica-alumina gel, ammonium- and hydrogen-exchanged zeolites, aluminum phosphate, titanium phosphate, zirconium phosphate, titanic acid; boric anhydride, metaboric acid, and ammonium borate; continuously distilling off the steam from the reaction system, and isolating the ε-caprolactam from the distillate.

2. The process of claim 1, wherein said ε-aminocaproic acid, ε-aminocaproamide or mixture thereof is present in the form of an aqueous solution.

3. The process of claim 1, wherein the steam introduced into the reaction system is superheated steam at a temperature of 200–450° C.

4. The process of claim 1, wherein the internal pressure of the reaction system is from atmospheric pressure to 3 atmospheres.

References Cited

UNITED STATES PATENTS 3,485,821  12/1969  Sheehan _____ 260—239.3

OTHER REFERENCES

Brown "Unit Operations" pp. 391–394 (Wiley) (1950).
Weissburgers "Tech of Organic Chemistry," 2nd ed. vol. IV pp. 462–472 (Interscience) (1965).
Pauling "General Chemistry" 1st ed. (Freeman) (1947) pp. 343–345.
Pauling "General Chemistry" 3rd ed. (Freeman) (1970) pp. 568–569.

HENRY R. JILES, Primary Examiner

R. T. BOND, Assistant Examiner